United States Patent Office 3,554,948
Patented Jan. 12, 1971

3,554,948
WAX COMPOSITIONS WITH NITROGEN-CONTAINING MATERIALS AS ANTIOXIDANTS
Henry R. Ertelt, Westfield, N.J., assignor to Esso Research and Engineering Company, a corporation of Delaware
No Drawing. Filed Nov. 30, 1966, Ser. No. 597,856
Int. Cl. C08f 45/52; C08g 51/52; C08k 1/64
U.S. Cl. 260—28
3 Claims

ABSTRACT OF THE DISCLOSURE

A wax composition inhibited against oxidation comprises petroleum wax and an oxidation inhibitor selected from the group consisting of (a) oil soluble copolymers having a basic amino nitrogen content such as the copolymer of beta-diethylaminoethyl methacrylate and an ester of methacrylic acid and a $C_{10}$ to $C_{20}$ alkanol, and (b) oil soluble amino alkyl phenols such as the condensation product of nonyl phenol, formaldehyde, and ethylene diamine.

---

This invention relates to the use of certain nitrogen-containing materials in wax compositions to inhibit oxidation. Particularly, the invention relates to polymers containing amine groups, and to certain high molecular weight amino phenols, which can be added to petroleum wax compositions to inhibit oxidation.

In wax treatment of paperboard or paper, either by impregnating or surface coating, the trend is to use wax compositions containing relatively large amounts of polymers, e.g. polyethylene, copolymers of ethylene and vinyl acetate, petroleum resins, etc. in order to improve the properties of the resultant waxed material. However, these newer polymer-containing wax compositions tend to be more viscous than the older simple wax compositions, and consequently they frequently are heated to a much higher temperature in order to reduce the viscosity for ease of application to the paperboard or paper. However, these higher temperatures generally accelerate oxidation of the wax composition. Thus, a typical wax composition held at a high temperature for a long period of time will tend to degrade and give off a fatty odor. This odor is apparently due to oxidation of the wax to form fatty acids, fatty alcohols, ketones, etc. which result in the objectionable fatty odor. In addition, these oxidation products, in the case of wax-treated food containers, can result in an undesirable taste transference to the food. In order to improve the oxidation resistance of wax compositions, various additives have been suggested and used. For example, phenol type antioxidants such as butylated hydroxy toluene (BHT), i.e. 2,6-ditertiary butyl paracresol, and 4,4'-methylene bis(2,6-ditertiary butyl phenol) are presently commercially used as antioxidants for wax compositions. The present invention is based upon a finding that certain amine-containing materials are also excellent oxidation inhibitors for wax, and in some wax formulations are even more effective than these aforementioned phenol type antioxidants. Thus, the present discovery provides the formulator with a wider variety of antioxidants than he can use in tailor-making wax compositions.

The polymers containing amine groups that can be used in accordance with the present invention include mineral oil-soluble copolymers of (1) acrylic or alpha substituted acrylic esters of aliphatic alcohols averaging at least 8, preferably 10 to 20 carbon atoms per alcohol chain per monomer molecule, and (2) ethylenically unsaturated compound containing a basic amino group such that the amino group appears in a side chain rather than in the main polymer chain in the copolymer. In the alpha substituted acrylic esters the alpha substituent is a $C_1$ to $C_7$ alkyl group, e.g. $C_1$ to $C_4$. In the aliphatic alcohol portion of the esters the carbon chains preferably are predominantly straight chains. Preferred monomer proportions are such that the basic amino nitrogen content of the copolymer will be in the range of about 0.2 to about 3.5 wt. percent, based on the total weight of the copolymer. Minor amounts of other amine-free ethylenically unsaturated compounds which will copolymerize with the above monomers may also be included, e.g. styrene, alkyl styrenes, butadiene, isobutylene, etc.

The aforesaid esters can be represented by the formula:

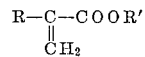

wherein R is hydrogen or a $C_1$ to $C_7$ alkyl group and R' is a $C_8$ to $C_{20}$ alkyl group. Examples of suitable esters are the tridecyl, lauryl, cetyl and octadecyl esters of acrylic and methacrylic acids as well as the "Lorol" esters of these acids. "Lorol" refers to the primary alcohol mixture of $C_{10}$ to $C_{18}$ carbon atoms, obtained by the hydrogenation of coconut oil. It is described in U.S. 2,560,588 and varies in average molecular distribution from $C_{12.5}$ to $C_{13.5}$. Typical distributions are as follows.

| | Weight percent |
|---|---|
| $C_{10}$ | 1–4 |
| $C_{12}$ | 46–85 |
| $C_{14}$ | 13–24 |
| $C_{16}$ | 1–15 |
| $C_{18}$ | 2–17 |

It is to be understood, therefore, that the term "Lorol" here means a mixture of normal aliphatic alcohols having from 10 to 18 carbon atoms and particularly about 50% to about 60% of $C_{12}$ alcohols.

The polymerizable ethylenically unsaturated compounds containing a basic amino group, can be represented by the following structure:

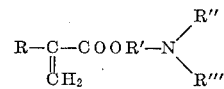

wherein R is hydrogen or a $C_1$ to $C_7$ alkyl group, R' is a $C_2$ to $C_5$ saturated, aliphatic hydrocarbon group, i.e. an alkylene group, and R" and R''' are hydrogen or $C_1$ to $C_4$ hydrocarbon groups. Preferred are the basic tertiary amino-alkyl acrylates, such as the dialkyl amino-alkyl acrylates and alpha hydrocarbon substituted acrylates, beta dimethylaminoethyl acrylate and methacrylate, and their homologs and analogs. Specific examples of such copolymers include the copolymer of 80 weight percent of Lorol methacrylate and 20 weight percent of diethylamino ethyl methacrylate, and the copolymer of 84.25 weight percent of Lorol methacrylate, and 15.75 weight percent aminoisobutyl methacrylate. Copolymers of this type, having inherent viscosities within the range of 0.1 to 3 as determined at 0.1% weight/volume concentration in benzene at 25° C., are known in the art and are described in U.S. Pat. No. 2,737,452 as fuel oil additives.

Amino phenols contemplated for use in the present invention are known as lube oil additives, for example see U.S. Pats. 2,353,491; 2,459,112 and 3,036,003. These materials can be prepared by reacting aldehyde, alkylene polyamine, and phenol or alkyl phenol. The reaction is preferably carried out in the presence of a hydrocarbon diluent, e.g. mineral lubricating oil. Generally, the reactants will be utilized in a ratio of about 0.5 to 2.0 moles of the aldehyde and the alkyl phenol for each nitrogen atom present in the polyamine.

Aldehydes in general are contemplated for making the amino phenols, although preferred aldehydes are the $C_1$ to $C_{10}$ aliphatic aldehydes, such as formaldehyde, acetaldehyde, propionaldehyde, etc., with formaldehyde being especially preferred.

Alkylene polyamines suitable in the above reaction include those characterized by the general formula:

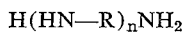

wherein R is a substituted or unsubstituted $C_2$ to $C_6$ saturated hydrocarbon group, i.e. an alkylene group, and $n$ is an integer from 1 to 10. Representative amines within the above formula include diethylenetriamine, tetraethylene pentamine, ethylene diamine, propylene diamine, etc. Preferred polyamines are the alkylene diamines, with ethylene diamine being particularly preferred.

Other suitable amines include polymerized ethylene imines having a molecular weight of about 1,000 to 40,000.

The alkyl phenols are typified by at least one phenol nucleus having 1 to 4, alkyl groups of 4 to 20, preferably 6 to 12, carbon atoms per alkyl group. Examples of such compounds will include n-nonyl phenol, isooctyl phenol, dilauryl phenol, etc.

A typical reaction procedure for making amino phenol involves adding the polyamine gradually to a mineral oil solution of alkyl phenol. To this reaction mixture is then added the aldehyde compound. The resulting mixture is usually heated to a temperature within the range of about 100 to 350° F., e.g. 160 to 200° F. and maintained at said temperature for about 1 to 4 hours. The final reaction mixture can then be further heated to a higher temperature, e.g. about 320° F., to remove any water which may be present.

Other solvents, e.g. heptane, benzene, toluene, xylene, etc. can be readily utilized as the reaction diluent in place of the aforementioned mineral oil. Utilization of mineral oil is advantageous, however, since it eliminates the necessity of solvent stripping.

The reaction time, temperature, and relative mole ratios of the reactants may be readily varied to form a variety of similar compounds. For example, a preferred form of compound, believed to have the approximate general formula:

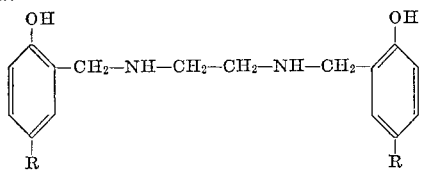

is prepared by reacting formaldehyde, an alkyl phenol, and ethylene diamine in the relative mole ratios of 2 moles of both the alkyl phenol and the aldehyde for each mole of the polyamine. An increase in this relative mole ratio will produce a mixture of compounds of varying degrees of hydrogen substitution on the amino groups. Thus, a utilization of the reactants in a ratio of 4 moles of both the alkyl phenol and aldehyde for each mole of the polyamine will produce a reaction mixture which is believed to predominantly contain a compound having the approximate general formula:

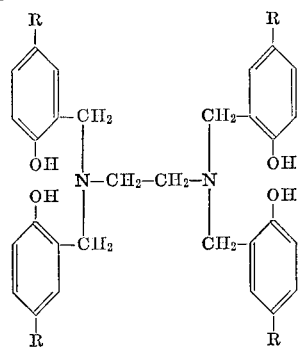

The wax composition to which the antioxidant additives of the invention are applied will usually comprise a major amount of wax which can be paraffin, microcrystalline, scale wax, slack wax, etc., which waxes are derived from petroleum, and which have melting points within the usual wax range from about 120° to about 180° F., preferably between about 130° and 175° F. For food packaging, the fully refined paraffin waxes and microwaxes, e.g. those meeting U.S. Food and Drug Administration purity requirements, FDA Regulations 121.1156 and 121.2586 are used containing additives, e.g. polyethylene, butyl rubber, polyisobutylene ethylene-vinyl acetate copolymers, terpene resins, petroleum resins, and the like. In such formulations petroleum wax will usually be the major component. Examples of polymers frequently added to wax include polyolefins, e.g. polyethylene, polypropylene and polyisobutylene, usually having an approximate average molecular weight between about 1,200 and 50,000, e.g. 4,000 to 16,000, (Staudinger).

Petroleum resins are another example of polymers used in many wax compositions. These resins are hydrocarbon resins usually commercially made by treating a hydrocarbon stream, e.g. a stream containing diolefins and olefins along with aromatics, paraffins, and naphthenes, with 0.25 to 1.75% of an aluminum halide catalyst such as aluminum chloride. The product is a substantially non-aromatic unsaturated hydrocarbon resin, usually having a softening point of about 207° to 218° F., a molecular weight in the range of 1,000 to 1,2000, and an iodine number (Wijs) of 100 to 140, usually below 120. Petroleum resins may be used in this form or may be subjected to hydrogenation to bring about a substantial reduction of unsaturation. Both unsaturated and hydrogenated petroleum resins are used in wax compositions.

Wax coating compositions for treating paperboard will frequently comprise a major amount of wax; 0 to 20, preferably 5 to 15 wt. percent of polyolefin; and about 0 to 20, preferably 5 to 15 wt. percent of petroleum resin. Minor amounts, e.g. 0.1 to 15 wt. percent, of other additives may be present, such as ethylenevinyl acetate copolymers having melt indexes of 2 to 500 and containing 15 to 40 wt. percent vinyl acetate, antioxidants, antifoamants, slip agents, dyes, and other materials well known in the art. All of said weight percents are based on the weight of the total composition.

About 0.002 to 0.5, preferably .005 to 0.2 wt. percent, based on the total composition, of the nitrogen containing additive of the invention is incorporated in these wax compositions by simple mixing into the molten wax composition.

The invention will be further understood by reference to the following examples which include a preferred form of the invention.

EXAMPLE I

A series of tests was carried out on a wax paperboard coating composition, hereinafter referred to as Composition 1, which consisted of 2.0 wt. percent of high density polyethylene (DYLT) of about 12,000 mol. wt.; 10.0 wt. percent of petroleum resin (Piccopale 100) having a melting point of about 100° F., an approximate mol. wt. of about 1,100, and a corrected iodine number of about 60; 70.4 wt. percent paraffin wax, M.P. 143° F.; 4.4 wt. percent paraffin wax, M.P. 151° F.; 9.68 wt. percent microwax, M.P. 175° F.; and 3.52 wt. percent microwax, M.P. 183° F.

To the above wax composition was added varying amounts of two nitrogen-containing additives of the invention, hereinafter defined as Additive A and Additive B, descriptions of which follow:

Additive A is an amino nonyl phenol of which a typical preparation follows, wherein all parts are by weight.

30.3 parts of nonyl phenol was dissolved in a mineral lubricating oil having a viscosity of 150 SSU at 100° F. 3.6 parts of ethylene diamine (98% purity) was then rapidly added to the oil solution and the resulting mixture was heated to about 180° F. with stirring. 3.8 parts of paraformaldehyde (95% purity) was then gradually added over a period of about one hour while still maintaining a temperature within the range of about 190° to 200° F. Following this, the reaction mixture was then aged at a temperature within said temperature range for a period of about 3 hours. The reaction mixture was dehydrated by heating to a temperature of about 320° F. and sparged with dry nitrogen gas. The finished material was a 40 wt. percent solution of amino nonyl phenol in 60 wt. percent of oil of 150 SSU viscosity at 100° F.

The nonyl phenol used above was a commercial product consisting of about 75 wt. percent mononyl phenol and about 25 wt. percent of a mixture which was predominantly dinonyl phenol with a small amount of phenol. The nonyl groups were derived from triisopropylene.

Additive B is an oil-soluble copolymer consisting of 80 wt. percent "Lorol 5" methacrylate and 20 wt. percent β-diethylaminoethyl methacrylate having an inherent viscosity in the range of 0.1 to 3.0. It was used in the form of 50 wt. percent concentrate dissolved in a low viscosity white oil. Preparation of this polymer is described in U.S. Pat. No. 2,974,025.

Composition 1, with and without Additives A and B, was tested in an oxidation test carried out by immersing 1 ft. of No. 18 copper wire wound into a cylindrical coil and placed in the bottom of a 300 cc. tall form beaker. 100 grams of the test composition was then added to the beaker. The beaker was covered with a watch glass and maintained in an oven at 270° F. Periodically, the beaker contents were checked for odor by smelling to determine the point at which the wax composition has deteriorated so as to give off an oxidized odor. Experience has shown that such a test for odor is more sensitive and reproducible than convenient chemical tests such as peroxide number determination. Similar tests were carried out at 300° F. and at 350° F., but with no copper catalyst present. In addition the color of the test compositions was observed at different points.

In addition, the aforesaid oxidation test was made using 2,6-ditertiary butyl para cresol, 4,4′methylene bis(2,6-ditertiary butyl phenol), and 4-hydroxymethyl-2,6-ditertiary butyl phenol, as comparisons.

The results obtained are summarized in the following Table I:

tions tested and the test results are summarized in Table II which follows:

TABLE II

| Oxidation inhibitor, wt. percent active ingredient | Hours to oxidized odor 270° F. Cu. present | 350° F |
|---|---|---|
| None | 12.5 | |
| .050 2,6 ditert. butyl para cresol | | 2 |
| .100 2,6 ditert. butyl para cresol | 13.5 | |
| .200 2,6 ditert. butyl para cresol | 16 | |
| .050 Additive A | 38 | 5 |
| .100 Additive A | | 7.5 |
| .050 Additive B | 30 | 2.5 |

As seen by Table II, Additives A and B, representing the invention, gave consistently better results than the prior art para cresol oxidation inhibiting additive.

EXAMPLE III

A further series of tests was carried out in a wax composition consisting of 50 wt. percent paraffin wax of 151° F. melting point; 20 wt. percent microwax of 175° F. melting point; 15 wt. percent ethylene/vinyl acetate copolymer (Elvax 260) containing about 28 wt. percent vinyl acetate*; and 15 wt. percent hydrogenated petroleum resin, (hydrogenated version of the resin used in Example I). The resulting compositions were tested as described in Example I with a copper strip present. The results obtained are summarized in the following table.

TABLE III

| Oxidation Inhibitor, wt. percent active ingredient | Hours to oxidized odor 270° F. copper present | Color after 56 hours. |
|---|---|---|
| None | 38½ | Amber. |
| 05 2,6 ditert. butyl para cresol | 39½ | Dark amber. |
| .05 Additive A | 56 | Yellow. |
| .05 Additive B | 43½ | Do. |

While the antioxidant additives of this invention have been found particularly useful in wax compositions containing additive components, the antioxidants of the invention also show antioxidant activity in compositions consisting essentially of petroleum wax. This is demonstrated by the following example.

TABLE I

| Oxidation inhibitor, weight percent active ingredient in Composition 1 | 270° F. Cu present Hours to odor | 300° F., no Cu Hours to odor | 300° F., no Cu Color at 9 hours | 350° F., no Cu. Hours to odor | 350° F., no Cu. Color |
|---|---|---|---|---|---|
| .005%—2,6 ditert. butyl para cresol | 12 | | | .5 | Light brown. |
| .030%—2,6 ditert. butyl para cresol | 16 | | | | |
| .050%—2,6 ditert. butyl para cresol | 21 | 5.5 | Deep red | .5 | Light brown. |
| .050%—4,4′methylene bis (2,6 ditertiary butyl phenol). | 14 | 2.5 | Deep red | | |
| .050%—4-hydroxymethyl-2,6-ditertiary butyl phenol. | 12 | | | | |
| .025%—Additive A | 24 | | | | |
| .050%—Additive A | | 10 | Light orange | 3¾ | Tan. |
| .025%—Additive B | 26 | | | | |
| .050%—Additive B | | 8 | Orange | | |

As seen by Table I, Additive A and Additive B of the invention were superior to the prior art oxidation phenolic inhibitors. Specifically, .025% of Additive A of the invention at 270° F. gave a longer life than any of the aforementioned prior art materials even though some were used in amounts as great as .05% active ingredient.

EXAMPLE II

Another series of tests were carried out on the same wax composition described in Example I. The composi-

EXAMPLE IV

A fully refined, narrow cut paraffin wax, having an ASTM D87 melting point of 151° F., an oil content (ASTM D721) of 0.2%, and having a width of cut (5%–95%) of 80° F. when subjected to vacuum distillation at 10 mm. (ASTM D1160), was used in the test series summarized below, which was carried out in the same

---

* And having a melt index of 2.4 to 3.4.

manner as described in Example I. The results are summarized in Table IV.

TABLE IV

| Additive, wt. percent: | Hours to oxidized odor at 270° F. cu. present |
|---|---|
| None | <16 |
| Additive A, 0.005 | 20 |
| Additive B, 0.005 | 18 |

Table IV shows that even very small concentrations of the additive of the invention result in a significant improvement. Larger amounts of the additives are, of course, more effective as demonstrated by Example V, which follows.

EXAMPLE V

A blend of refined petroleum waxes consisting essentially of 85 wt. percent paraffin waxes and 15 wt. percent microcrystalline waxes was mixed with 0.050 wt. percent of Additive A and tested in the manner previously described, except the test was made at 320° F. with no copper present. Here, the wax blend per se gave a detectable odor after 1½ hours at 320° F., but the addition of 0.050 wt. percent Additive A required 3½ hours before a slight oxidized odor resulted.

What is claimed is:

1. A wax composition inhibited against oxidation at elevated temperatures comprising a major proportion of petroleum wax and about .002 to .5 wt. percent as an oxidation inhibitor of an oil soluble amino alkyl phenol prepared by the condensation of formaldehyde, alkylene polyamine of the formula:

$$H(HN—R)_nNH_2$$

wherein R is a $C_2$ to $C_6$ alkylene radical and $n$ is 1 to 10, and a phenol of the formula:

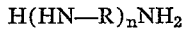
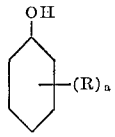

wherein R is a $C_6$ to $C_{12}$ alkyl group and $a$ is 1 to 4, in a relative molar ratio of .5 to 2 moles of aldehyde, and .5 to 2 moles of alkyl phenol, per each nitrogen atom present in the polyamine.

2. A composition according to claim 1, wherein said amino alkyl phenol is the condensation product of nonyl phenol, formaldehyde and ethylene diamine.

3. A wax composition inhibited against oxidation consisting essentially of a major amount of petroleum wax; about 0 to 20 wt. percent of $C_2$ to $C_4$ monoolefin polymer having a Staudinger molecular weight of about 1200 to 50,000; about 0 to 20 wt. percent of petroleum resin of 1000 to 1200 mol wt.; and about 0.005 to 0.2 wt. percent of oil soluble amino alkyl phenol prepared by the condensation of formaldehyde, alkylene polyamine of the formula:

$$H(HN—R)_nNH_2$$

wherein R is a $C_2$ to $C_6$ alkylene radical and $n$ is 1 to 10 and a phenol of the formula:

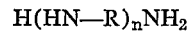
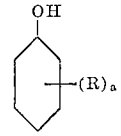

wherein R is a $C_6$ to $C_{12}$ alkyl group and $a$ is 1 to 4, in a relative molar ratio of .5 to 2 moles of aldehyde, and .5 to 2 moles of alkyl phenol per each nitrogen atom present in the polyamine.

References Cited

UNITED STATES PATENTS

| 2,353,491 | 7/1944 | Oberright | 252—42.7 |
| 2,737,452 | 3/1956 | Catlin | 44—62 |
| 2,887,514 | 5/1959 | Schmerling | 252—403 |
| 2,892,785 | 6/1959 | Harle | 252—403 |
| 3,036,003 | 5/1962 | Verdol | 252—33.4 |
| 3,146,273 | 8/1964 | Orloff | 208—21 |
| 3,175,010 | 3/1965 | Coffield | 208—21 |
| 3,189,647 | 6/1965 | Symon | 252—403 |
| 3,208,939 | 9/1965 | Latos | 252—403 |
| 3,255,255 | 6/1966 | Orloff | 208—20 |

MORRIS LIEBMAN, Primary Examiner

P. R. MICHL, Assistant Examiner

U.S. Cl. X.R.

252—403, 404; 260—28.5